United States Patent [19]

Tanaka

[11] Patent Number: 4,544,385
[45] Date of Patent: Oct. 1, 1985

[54] AIR DRYER DEVICE FOR COMPRESSED AIR SYSTEM OF VEHICLE

[75] Inventor: Masakatsu Tanaka, Yokosuka, Japan

[73] Assignee: Nippon Air Brake Co., Ltd., Japan

[21] Appl. No.: 636,416

[22] Filed: Jul. 31, 1984

[30] Foreign Application Priority Data

Sep. 13, 1983 [JP] Japan .................. 58-142134[U]

[51] Int. Cl.⁴ ............... B01D 53/00; B01D 45/16
[52] U.S. Cl. ........................ 55/208; 55/218;
55/267; 55/316; 55/389; 55/DIG. 17; 137/341
[58] Field of Search ............... 55/208, 218, 267, 269,
55/316, 385 B, 387, 389, 421, DIG. 17;
137/203, 204, 341; 251/62

[56] References Cited

U.S. PATENT DOCUMENTS

| | | | |
|---|---|---|---|
| 2,007,358 | 7/1935 | Anger | 137/341 X |
| 2,020,492 | 11/1935 | Zahm | 137/341 |
| 2,556,557 | 6/1951 | Schweitzer, Jr. | 137/341 |
| 2,564,873 | 8/1951 | Wright | 137/341 X |
| 2,669,321 | 2/1954 | Schmidlin | 55/218 |
| 3,080,882 | 3/1963 | Baker | 137/341 X |
| 3,093,467 | 6/1963 | McLaughlin | 55/269 X |
| 3,364,658 | 1/1968 | Walker | 55/421 X |
| 3,410,286 | 11/1968 | Satake | 137/341 X |
| 3,575,199 | 4/1971 | Beattie | 137/341 |
| 3,580,267 | 5/1971 | Baker | 137/341 X |
| 3,658,085 | 4/1972 | Cannella | 137/341 |
| 3,733,459 | 5/1973 | Lengstorf | 137/341 X |
| 3,841,064 | 10/1974 | Hitchiner et al. | 55/269 |
| 4,026,685 | 5/1977 | Grix | 55/218 X |
| 4,052,178 | 10/1977 | Frantz | 55/218 X |
| 4,110,602 | 8/1978 | McDade | 137/341 X |
| 4,113,451 | 9/1978 | Frantz | 55/267 X |
| 4,336,821 | 6/1982 | Frantz et al. | 137/204 X |
| 4,409,005 | 10/1983 | McKendrick | 55/218 X |

Primary Examiner—Robert Spitzer
Attorney, Agent, or Firm—Kane, Dalsimer, Kane, Sullivan and Kurucz

[57] ABSTRACT

An air dryer device for a compressed air system of a vehicle includes a housing and a dryer mounted within the housing and containing a desiccant for drying compressed air from a compressor of the compressed air system. A drain valve is mounted within the housing and includes a valve body having a valve port and a valve seat. A hollow elongated control piston is mounted within the valve body for movement along an axis thereof. A valve element is mounted on the control piston and is normally urged into sealing engagement with the valve seat to close the valve port. The control piston is responsive to a pneumatic signal from an air governor of the compressed air system for being moved along its axis to bring the valve element out of sealing engagement with the valve seat to open the drain valve. An elongated heater member is mounted at one end on the valve body for generating heat. The heater member is received in an axial bore of the control piston. The other end of the heater member is disposed close to the valve element to transmit the heat of the heater member to the valve element and the valve seat.

5 Claims, 2 Drawing Figures

AIR DRYER DEVICE FOR COMPRESSED AIR SYSTEM OF VEHICLE

BACKGROUND OF THE INVENTION

1. Field of the Invention

This invention relates to an air dryer device for drying compressed air of a compressed air system, such as an air brake, for a vehicle.

2. Prior Art

A conventional air dryer device under consideration comprises a drain valve mounted on a lower portion of a dryer housing for discharging water condensed from water vapor of compressed air supplied from a compressor to the air dryer device. Generally, the drain valve is automatically opened to discharge the water upon application of a pneumatic signal from an air governor to the drain valve.

In winter or in cold climates, the water remaining on the drain valve near its valve element is susceptible to freezing so that the drain valve can not be operated properly. In order to overcome this freezing, an electric heater has heretofore been mounted near the drain valve, the electric heater being powered by a battery of the vehicle. The heater in the form of a rod is received in a hole formed in the body of the drain valve. Therefore, the heat generated by the heater is transmitted to the valve body and is radiated to the ambient atmosphere since the drain valve body is made of metal of a high heat conductivity such as aluminum. Thus, the heat generated by the heater is subjected to a substantial loss. To compensate for such a heat loss, the capacity of the heater as well as the capacity of the battery must be increased.

SUMMARY OF THE INVENTION

It is therefore an object of this invention to provide an air dryer device for a compressed air system of a vehicle in which the freezing of a drain valve is prevented with a less loss of the heat of a heater member.

According to the present invention, there is provided an air dryer device for a compressed air system of a vehicle, the compressed air system having a compressor for supplying compressed air, an air reservoir for storing the compressed air and an air governor for feeding a pneumatic signal, the air dryer device comprising a housing; a dryer mounted within the housing and containing a desiccant for drying the compressed air from the compressor, the dryer being connectable to the air reservoir for feeding the dried compressed air thereto; a drain valve mounted within the housing, said drain valve including (i) a valve body having a valve port and a valve seat disposed adjacent to the valve port, (ii) a hollow elongated control piston mounted within the valve body for movement along an axis thereof, the control piston having a bore extending along the axis thereof, (iii) a valve element mounted on the control piston, and (iv) means for normally urging the valve element into sealing engagement with the valve seat to close the valve port, said control piston being responsive to the pneumatic signal from the air governor for being moved along its axis to bring the valve element out of sealing engagement with the valve seat to open the drain valve, thereby communicating the interior of the housing with the atmosphere; and an elongated heater member mounted at one end thereof on the valve body for generating heat, said heater member being received in the axial bore of the control piston, the other end of the heater member being disposed close to the valve element to transmit the heat of the heater member to the valve element and the valve seat.

One reason why the elongated heater member is inserted in the control piston is that a path of transmission of the heat from the heater member to the valve element is shortened to heat the valve seat and the valve element in an efficient manner. Another reason is that the heater member is surrounded by the drain liquid from the dryer to prevent the transmission of the heat of the heater member to the drain valve body as much as possible because the drain liquid has a substantially greater specific heat than the drain valve body.

DESCRIPTION OF THE PREFERRED EMBODIMENT OF THE INVENTION

Figure 1:
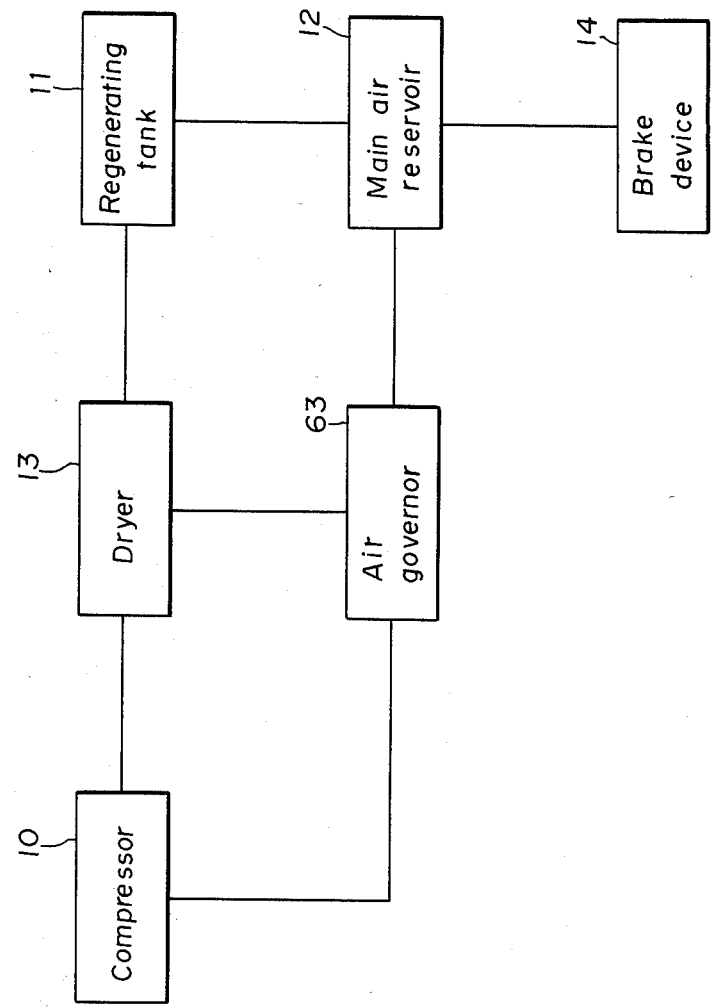
FIG. 1 is a schematic block diagram of an air brake system for a vehicle.

FIG. 1 schematically shows an air brake system for a vehicle which comprises a compressor 10 which supplies compressed air to a regenerating tank 11 and a main air reservoir 12 via an air dryer device 13. The compressed air is fed from the main reservoir 12 to a brake device 14 upon actuation of an associated brake valve (not shown) to operate the brake device 14 to brake the vehicle in the well known manner.

Figure 2:
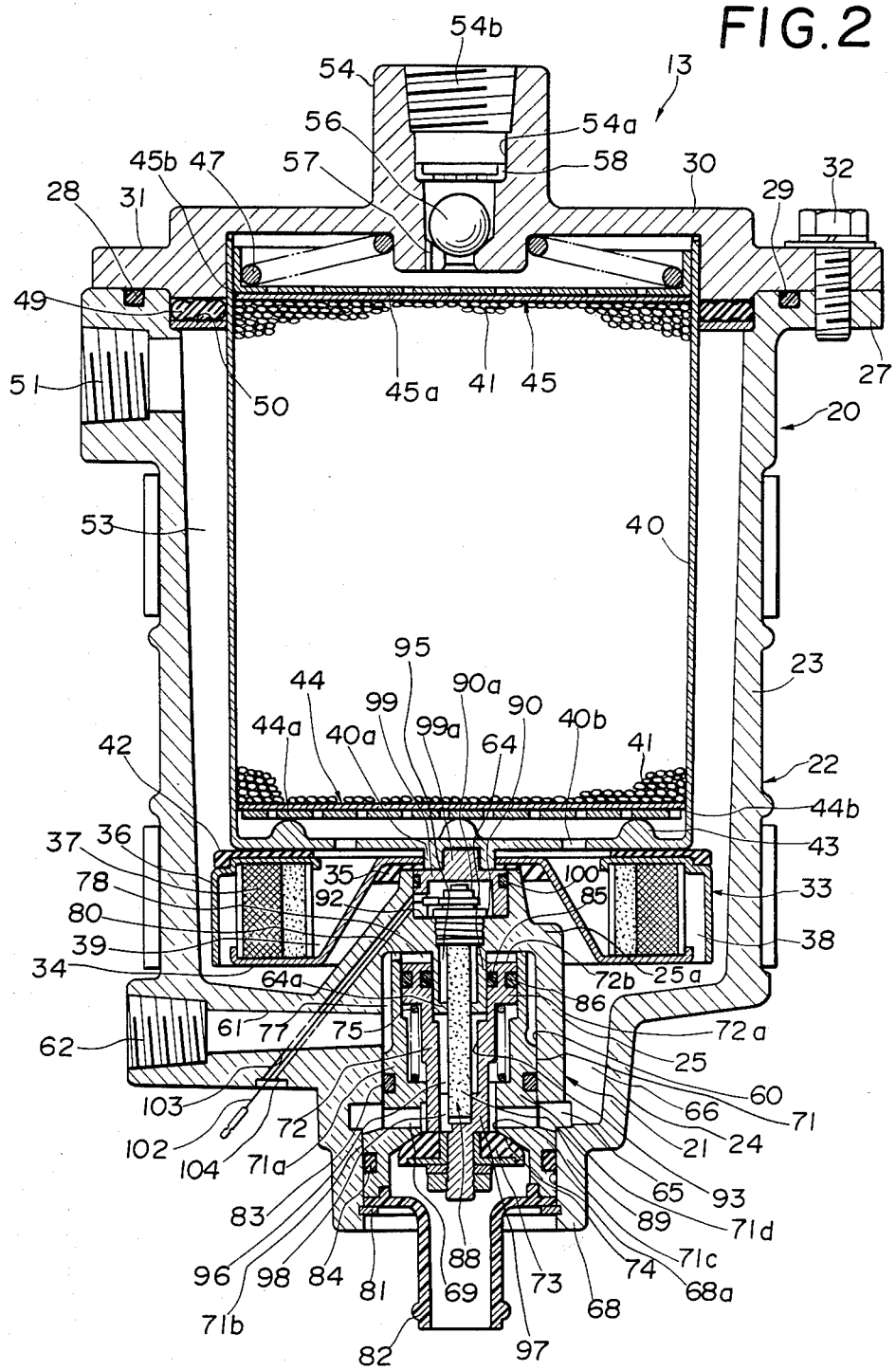
FIG. 2 is a cross-sectional view through an air dryer device according to the present invention installed in the air brake system.

As shown in FIG. 2, the air dryer device 13 comprises a dryer 20 for drying the compressed air fed from the compressor 10, and a drain valve 21 for discharging a drain liquid composed of water condensed from water vapor of the compressed air and oil from the compressor 10. The air dryer device 13 includes a one-piece housing 22 which is made of metal such as aluminum and has a major cylindrical portion 23, a lower portion 24 extending downwardly from the major cylindrical portion 23, and an inner hollow portion 25 formed integral with the lower portion 24 and extending into the major cylindrical portion 23. The major cylindrical portion 23 serves as a casing for the dryer 20 while the lower portion 24 and the inner hollow portion 25 cooperate with each other to serve as a body for the drain valve 21 as later described. The upper end of the major cylindrical portion 23 is directed outwardly to provide a peripheral flange 27. A peripheral groove 28 is formed in the upper surface of the flange 27, and a seal ring 29 is received in the groove 28. A lid 30 of a circular shape has a peripheral flange 31 and is connected to the major cylindrical portion 23 by a plurality of bolts 32 threaded through the mated flanges 31 and 27. The seal ring 29 ensures an air-tight connection between the lid 30 and the major cylindrical portion 23.

A filter unit 33 is provided within the major cylindrical portion 23 for removing contaminants such as oil, dust and dirt contained in the compressed air fed from the compressor 10. The filter unit 33 is mounted on the upper end of the inner hollow portion 25 through a support member 34 and a seal member 35. The filter unit 33 comprises a body 36 and an annular filter element 37 received within the filter body 36 and supported by the support member 34. An outer annular space 38 is formed by the filter body 36 and the filter element 37, and an inner annular space 39 is formed by the filter element 37 and the support member 34.

The dryer 20 comprises a cylindrical container 40 for holding a desiccant 41 such as molecular sieves, the container 40 having an open top and being mounted on the filter unit 33 through an annular seal member 42. The upper end of the container 40 is fitted in a bore of the lid 30. A plurality of projections 43 are formed on the bottom wall of the container 40 which has a plurality of apertures 40b formed therethrough. A lower end member 44 is placed on the projections 43 and is composed of a perforated plate 44a of metal and an air-permeable element 44b secured to the plate 44a. The desiccant 41 in the form of granules are filled in a space defined by the side wall of the container 40, the lower end member 44 and an upper end member 45 fitted in the upper end of the container 40. The upper end member 45 is composed of a perforated plate 45a of metal and an air-permeable element 45b secured to the plate 45a, the perforated plate 45a being of a dish-shaped. A spring 47 acts between the lid 30 and the perforated plate 45a to urge the upper end member 45 toward the lower end member 44. The desiccant 41 in the container 40 may be formed into powder due to vibration to which the air dryer device 13 is subjected. The air-permeable elements 44b and 45b serve to prevent the powdered desiccant 41 from passing through the apertures of the perforated plates 44a and 45a.

An annular seal member 49 is fitted on the container 40 adjacent to its upper end, the seal member 49 being held in position by the lid 30, the major cylindrical portion 23 and a retaining ring 50 fitted on the container 40. The seal member 49 ensures an air-tight connection between the container 40 and the lid 30. An inlet port 51 is formed through the major cylindrical portion 23 adjacent to its upper end. An annular space 53 is formed by the major cylindrical portion 23 and the side wall of the container 40, the annular space 53 leading to the inlet port 51. A central tubular portion 54 is formed on the lid 30 and has a bore 54a serving as an outlet port. A valve element 56 in the form of a ball is received in the lower end of the tubular portion 54 to provide a check valve. A bypass 57 for the check valve is formed in the tubular portion 54, and a perforated retaining disc 58 is mounted within the tubular portion 54 and disposed adjacent to the valve element 56. A thread 54b for connection to a pipe is formed in the bore 54a adjacent to the upper end of the tubular portion 54.

The compressed air supplied from the compressor 10 is fed through the inlet port 51, the space 54, the filter unit 33, the dryer container 40 to the outlet port 54a. The compressed air is further fed from the outlet port 54a to the regenerating tank 11 and the main air reservoir 12. The compressed air is stored in the regenerating tank 11 and the main reservoir 12. When the compressed air passes through the filter unit 33, the compressed air is first introduced into the outer annular space 38 and passes through the filter element 37 into the inner annular space 39, thereby removing the contaminants contained in the compressed air. Also, the water content of the compressed air is reduced to an acceptable level by the desiccant 41 when passing through the dryer 20.

The inner hollow portion 25 has a cylindrical bore 60 disposed substantially coaxially with the main cylindrical portion 23 of the housing 22. A transverse passageway 61 is formed through the lower portion 24 of the housing 22 and has at its outer end a threaded port 62 for connection to an air governor 63, the passageway 61 leading to the cylindrical bore 60. The inner hollow portion 25 of the housing 22 has an inner cylindrical section 64 extending into the bore 60 in coaxial relation thereto. A port 65 is formed through the inner hollow portion 25, and a space 66 is formed by the hollow portion 25 and the lower portion 24. The cylindrical bore 60 is in communication with the interior of the main cylindrical portion 23 through the port 65 and the space 66. A bore 68a of a lower cylindrical section 68 of the lower portion 24 is continuous with the cylindrical bore 60 so that the bore 60 cooperates with the bore 68a to provide a chamber 69, the bore 68a being greater in diameter than the bore 60 and disposed coaxially therewith.

A plug 71 is fitted in the chamber 69 and has an upper tubular portion 71a and a lower tubular portion 71b of a greater diameter extending from the upper portion 71a. That part 71c of the inner surface of the upper portion 71a disposed adjacent to the lower portion 71b serves as a valve port. An elongated hollow control piston 72 is received in the plug 71 for sliding movement along an axis thereof, with its upper end fitted on the cylindrical section 64 of the inner hollow portion 25 of the housing 22. A valve element 73 of an elastic material for closing the valve port 71c is mounted on a lower end of the control piston 72. A tapered valve seat 74 is formed on the inner surface of the lower portion 71b of the plug 71 adjacent to the valve port 71c. Urging means 75 in the form of a compression coil spring is mounted around the control piston 72 and acts between an upper flange 72a of the control piston 72 and an intermediate flange 71d of the plug 71. An annular space 77 is defined by the inner hollow portion 25 and the plug 71, and an annular space 78 is defined by the inner hollow portion 25, the plug 71 and the control piston 72. A notch 80 is formed in the upper end of the plug 71. With this construction, pressurized air is adapted to be supplied from the air governor 63 to the space 78 through the port 62, the transverse passageway 61, the space 77 and the notch 80. The plug 71 is held in position by a retaining ring 81 together with a drain tube 82. A pair of seal rings 83 and 84 are mounted around the plug 71, and a pair of seal rings 85 and 86 are mounted on the upper end of the control piston 72 on opposite sides thereof.

When the pressure of the air in the main reservoir 12 is below a predetermined level, the compression spring 75 urges the control piston 72 upwardly to hold the valve element 73 in sealing engagement with the valve seat 74 to close the drain valve 21. When the pressure of the air in the main reservoir 12 reaches the predetermined level, pressurized air is applied as a pneumatic signal to the space 78 from the air governor 63 and acts on the upper surface 72b of the control piston 72 to move the control piston 72 downwardly against the bias of the spring 75, thereby bringing the valve element 73 out of sealing engagement with the valve seat 74 to open the drain valve 21. Water droplets resulting from condensation of the water vapor of the compressed air are formed on the inner surface of the housing 22. The water droplets constitute the drain liquid. The drain liquid also contains oil escaping from the compressor 10 and entrained in the compressed air. When the drain valve 21 is opened, the drain liquid in the space 66 is discharged from the drain tube 82 through the port 65 and the valve port 71c.

An elongated heater member 88 comprises a heater portion 89 in the form of a rod and a threaded portion 90 secured to the upper end of the heater portion 89. The heater member 88 is an electric heater and has an electric heating element contained in the heater portion 89. The threaded portion 90 is threaded into an upper wall 25a of the inner hollow portion 25, and the upper end 90a of the threaded portion 90 is received in a recess 92 formed in the upper end of the inner hollow portion 25. The control piston 72 has an elongated bore 93 extending along an axis thereof. The heater portion 89 extends through the cylindrical section 64 of the inner hollow portion 25 into the bore 93 of the control piston 72. The cylindrical section 64 is spaced from the heater portion 89 to form an annular space 95 therebetween and engages the heater portion 89 only at a flange 64a at a lower end thereof. Also, the inner surface of the control piston 72 defining the bore 93 is spaced from the heater portion 89 to form an annular space 96 therebetween and engages at its lower end a projection 97 formed on the inner surface of the bore 93 at the lower end thereof, the projection being disposed adjacent to the valve element 73. A port 98 is formed in the lower end of the control piston 72 to communicate the annular spaces 95 and 96 with the atmosphere when the drain valve 21 is opened. The surface of the projection 97 with which the heater portion 89 is in contact is of a size sufficient to efficiently transmit the heat from the heater portion 89 to the valve element 73 and the valve seat 74, thereby preventing the freezing of the valve element 73 onto the valve seat 74.

A cap 99 is fitted in the recess 92 in the upper end of the inner hollow portion 25 of the housing 22, and a seal ring 100 is mounted around the cap 99 and ensures a liquid-tight connection between the cap 99 and the upper end of the inner hollow portion 25, thereby preventing the water vapor and moisture of the compressed air from intruding into the recess 92. The seal ring 100 may be omitted because of the provision of the seal member 35. A boss 99a is formed on the upper surface of the cap 99 and fitted in a tubular section 40a formed on the bottom wall of the dryer container 40. Thus, the boss 99a serves as registration means for placing the dryer container 40 in position within the main cylindrical portion 23 of the housing 22.

A lead wire 102 is fixed to the upper end of the threaded portion 90 of the heater member 88 and is electrically connected to the electric heating element in the heater portion 89. The lead wire 102 passes through a hole 103 formed in the inner hollow portion 25 and lower portion 24 of the housing 22 and is electrically connected to a battery (not shown) of the vehicle. The threaded portion 90 of the heater member 88 is grounded to a body of the vehicle via the drain valve body. A thermostat may be connected between the heater member 88 and the battery of the vehicle for selectively heating the heater member 88. A recess 104 is formed in that region of the lower portion 24 where the hole 103 is open. A filter or a rubber cap may be fitted in the recess 104 to prevent contaminants such as dust and dirt from being introduced into the hole 103.

As described above, the lower end of the heater portion 89 inserted into the bore 93 of the control piston 72 is disposed close to the valve element 73, and therefore the valve element 73 and the valve seat 74 are efficiently heated by the heater portion 89, thereby preventing the freezing of the valve element 73 onto the valve seat 74 due to the drain liquid. Also, there are occasions when the valve element 73 is held apart from the valve seat 74 when the drain valve 21 is in its open position. The heater member 88 also suitably prevents this freezing. With this construction, the heater member 88 can be of a small size while ensuring a sufficient heat transmission to the valve element 73 and the valve seat 74, and the battery of the vehicle serving as a heat source for the heater member 88 consumes less electricity. The control piston 72 is surrounded by the drain liquid having a relatively great specific heat, so that the transmission of the heat of the heater portion 89 to the drain valve body is reduced, therby reducing a loss of the heat from the heater portion 89. In addition, the heat loss of the heater member 88 is further reduced by the provision of the spaces 95 and 96.

While the air dryer device according to the present invention has been specifically shown and described herein, the invention itself is not to be restricted by the exact showing of the drawings or the description thereof. For example, although in the illustrated embodiment, the drain valve 21 is of the vertical type, it may be of the horizontal type. Also, the electric heater member 88 may be replaced by a heater means utilizing the heat of an exhaust gas discharged from an engine of the vehicle.

What is claimed is:

1. An air dryer device for a compressed air system of a vehicle, said compressed air system having a compressor for supplying suppressed air, an air reservoir for restoring the compressed air and an air governor for feeding a pneumatic signal, said air dryer device comprising:
   (a) a housing;
   (b) a dryer mounted within said housing and containing a desiccant for drying the compressed air from the compressor, said dryer being connectable to the air reservoir for feeding the dried compressed air thereto;
   (c) a drain valve mounted within said housing, said drain valve including (i) a valve body having a valve port and a valve seat disposed adjacent to said valve port, (ii) a hollow elongated control piston mounted within said valve body for movement along an axis thereof, said control piston having a bore extending along its axis (iii) a valve element mounted on said control piston, and (iv) means for normally urging said valve element into sealing engagement with said valve seat to close said valve port, said control piston being responsive to the pneumatic signal from the air governor for being moved along its axis to bring said valve element out of sealing engagement with said valve seat to open said drain valve, thereby communicating the interior of said housing with the atmosphere; and
   (d) an elongated heater member mounted at one end thereof on said valve body for generating heat, said heater member being received in said bore of said control piston, the other end of said heater member being disposed close to said valve element to transmit the heater of said heater member to said valve element and said valve seat, a projection being formed on the inner surface of said bore of said control piston adjacent to said valve element, and said heater member engaging said projection and being spaced from said inner surface of said bore.

2. An air dryer device according to claim 1, in which said heater member is an electric heater and is electrically connectable to a battery of the vehicle for being powered.

3. An air dryer device according to claim 1, in which said control piston is disposed generally vertically.

4. An air dryer device according to claim 1, wherein said housing is of a generally tubular shape having a peripheral wall, said housing having an elongated inner hollow portion formed therewithin at one end thereof and extending along a length thereof, said inner hollow portion being spaced inwardly from said peripheral wall of said housing to form a space therebetween, said inner hollow portion constituting part of said valve body, and said inner hollow portion having a port formed therethrough adjacent to said valve port to communicate the interior of said inner hollow portion with said space, said control piston being received in said inner hollow portion.

5. An air dryer device according to claim 4, wherein said housing has an inner hollow portion communicating with the interior of said housing through a port formed through said inner hollow portion, said valve body comprising said inner hollow portion and a plug is received in said inner hollow portion, said plug having said valve seat and said valve port.

* * * * *